US010968053B2

(12) United States Patent
Gabrione et al.

(10) Patent No.: US 10,968,053 B2
(45) Date of Patent: Apr. 6, 2021

(54) PLANTS FOR IMMERSION OF BODYWORKS

(71) Applicant: GEICO S.p.A., Cinisello Balsamo (IT)

(72) Inventors: Giambattista Gabrione, Cinisello Balsamo (IT); Salvatore Frustaci, Cinisello Balsamo (IT)

(73) Assignee: GEICO S.P.A., Cinisello Balsamo (IT)

( * ) Notice: Subject to any disclaimer, the term of this patent is extended or adjusted under 35 U.S.C. 154(b) by 0 days.

(21) Appl. No.: 16/635,925

(22) PCT Filed: Jul. 30, 2018

(86) PCT No.: PCT/IB2018/055680
§ 371 (c)(1),
(2) Date: Jan. 31, 2020

(87) PCT Pub. No.: WO2019/025941
PCT Pub. Date: Feb. 7, 2019

(65) Prior Publication Data
US 2020/0231389 A1    Jul. 23, 2020

(30) Foreign Application Priority Data

Aug. 1, 2017   (IT) .................. 102017000088764

(51) Int. Cl.
*B62D 65/18*    (2006.01)
*B65G 49/04*    (2006.01)
*B65G 49/02*    (2006.01)
(52) U.S. Cl.
CPC ......... *B65G 49/0463* (2013.01); *B62D 65/18* (2013.01); *B65G 2201/0294* (2013.01)
(58) Field of Classification Search
None
See application file for complete search history.

(56) References Cited

U.S. PATENT DOCUMENTS 2,598,163 A * 5/1952 Halls .................. B05C 3/10
427/234
6,991,087 B2 * 1/2006 Krannich ............ B05C 3/10
118/416
(Continued)

FOREIGN PATENT DOCUMENTS

| FR | 2589135 A1 | 4/1987 |
| WO | 2003070545 A1 | 8/2003 |
| WO | 2012152385 A1 | 11/2012 |

OTHER PUBLICATIONS

International Search Report and Written Opinion in corresponding International Application No. PCT/IB2018/055680, dated Oct. 30, 2018, 10 pages.

*Primary Examiner* — Kavel Singh
(74) *Attorney, Agent, or Firm* — MH2 Technology Law Group LLP

(57) ABSTRACT

A plant for treatment of car bodies may include: transport units to carry car bodies; a first transport line to move the transport units between a starting zone and an arrival zone so as to pass over at least one treatment tank; and a second transport line along which empty transport units are returned. The second transport line is configured to convey the transport units rotated on one side relative to a normal position for transporting the car bodies. A first transfer device is configured to pick up a transport unit from the first transport line, rotate the transport unit on one side, and to deliver the transport unit to the second transport line. A second transfer device is configured to pick up a transport unit from the second transport line, rotate the transport unit into the normal position, and deliver the transport unit to the first transport line.

20 Claims, 6 Drawing Sheets

(56) References Cited

U.S. PATENT DOCUMENTS

| | | | |
|---|---|---|---|
| 8,459,439 B2* | 6/2013 | Guerra | B66F 7/22 |
| | | | 198/346 |
| 8,590,482 B2* | 11/2013 | Nishihara | B05C 3/10 |
| | | | 118/425 |
| 9,193,542 B2* | 11/2015 | Covizzi | B65G 49/0409 |
| 10,370,197 B2* | 8/2019 | Iglio | B65G 49/0459 |
| 2006/0180470 A1* | 8/2006 | Fage | C25D 13/22 |
| | | | 204/622 |

* cited by examiner

PLANTS FOR IMMERSION OF BODYWORKS

CROSS-REFERENCE TO RELATED APPLICATION(S)

This application is a national stage entry from International Application No. PCT/IB2018/055680, filed on Jul. 30, 2018, in the Receiving Office ("RO/IB") of the World Intellectual Property Organization ("WIPO"), published as International Publication No. WO 2019/025941 A1 on Feb. 7, 2019. International Application No. PCT/IB2018/055680 claims priority under 35 U.S.C. § 119 from Italian Patent Application No. 102017000088764, filed on Aug. 1, 2017, in the Italian Patent and Trademark Office ("IPTO"), the entire contents of all of which are incorporated herein by reference.

The present invention relates to a plant for the treatment of car bodies by immersion thereof in one or more tanks, for example for the purposes of anti-corrosion pre-treatment, cataphoresis or the like.

In the technical sector treatment plants are known where the car bodies are transported along transport lines by means of special transport units (for example carriages or skids). The car bodies thus pass over treatment plants inside which they are immersed by means of special immersion devices present on the transport units and for example consisting of platforms which rotate or are turned over inside the tank together with the car body.

Once they have completed their function and the car bodies have been removed, the transport units must be brought back to the start of the travel path in order to each receive a new car body to be transported along the plant.

This gives rise to significant problems regarding management of the transport units and the space occupied within the plant since it is required to provide a special return transport line which brings the transport units back to the start.

Moreover, the system for transferring the transport units from the outward transport line above the tanks to the return transport line may also be complex and bulky. This transfer operation may result in jamming which necessarily causes stoppage of the entire plant.

The return operation may also be slow and many transport units with the immersion systems may also be necessary, something which is disadvantageous since each transport unit with immersion system may be relatively costly.

The general object of the present invention is to provide a plant with units for transporting car bodies above and inside treatment tanks which is able to avoid or at least reduce the drawbacks of the prior art and which facilitates the return movement of the car body transport units while occupying little space.

A further object is to allow a reduction in the number of transport units needed in the plant and, preferably, achieve a reduction in the cost of the units and/or the systems for returning them to the start of the plant.

In view of these objects the idea which has occurred according to the present invention is to provide a plant for the treatment of car bodies by immersion in at least one treatment tank, comprising a plurality of transport units, each intended to transport a car body, a first transport line along which the transport units with the car bodies move sequentially between a starting zone and an arrival zone so as to pass above at least one treatment tank and immerse the car bodies by means of car body immersion devices, and a second transport line along which the empty transport units are returned from the arrival zone to the starting zone, characterized in that the second transport line is adapted to convey the transport units rotated on one side vertically relative to their normal position for transporting the car bodies and in the arrival zone there is a first transfer device which picks up a transport unit from the first transport line, rotates it on one side vertically so as to bring it into a return condition and delivers it to the second transport line, and in the starting zone there is a second transfer device which picks up a transport unit from the second transport line in the return condition, rotates it into the normal position for carrying the car bodies and delivers it to the first transport line.

In order to illustrate more clearly the innovative principles of the present invention and its advantages compared to the prior art, an example of embodiment applying these principles will be described below with the aid of the accompanying drawings. In the drawings.

With reference to the figures, these show a plant according to the invention, denoted generally by 10, for the treatment of car bodies 11 by means of their immersion in at least one treatment tank 12. The treatment tank 12 will contain a known liquid suitable for the desired treatment (for example an anti-corrosion treatment or cataphoresis), as may be easily imagined by the person skilled in the art.

The plant 10 comprises a plurality of transport units 13, each intended to transport a car body.

Figure 1:
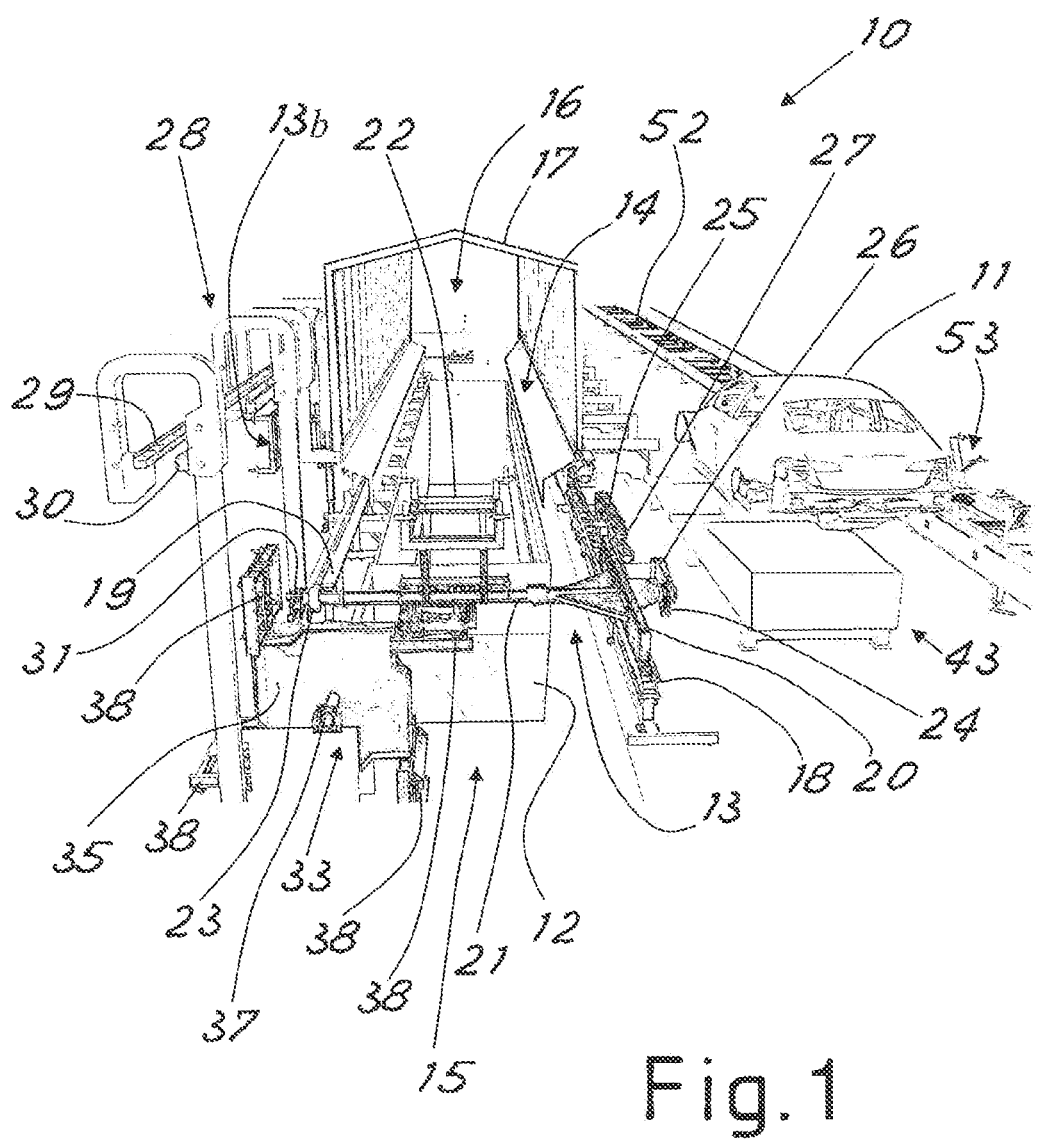
FIG. 1 shows a schematic perspective view from an entry end of a plant according to the invention.
Figure 2:
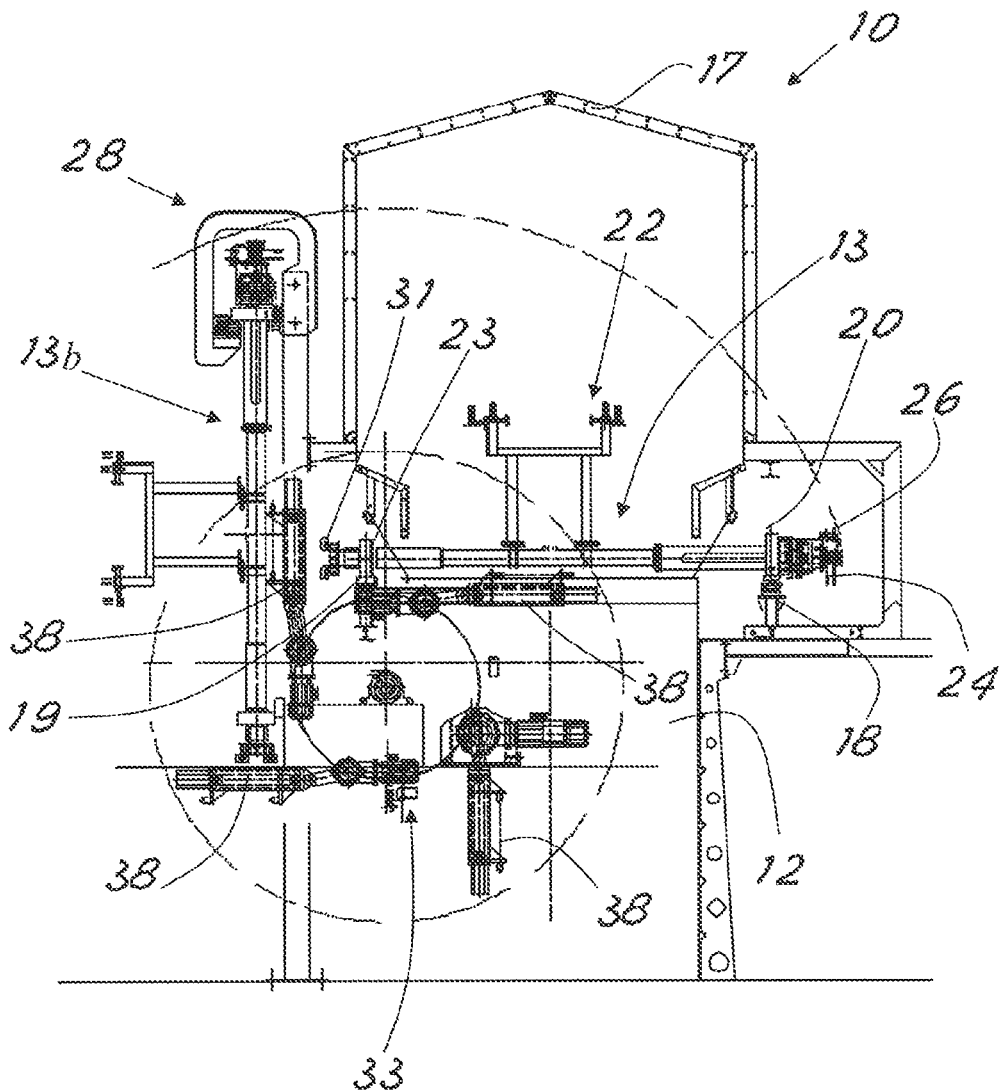
FIG. 2 shows a schematic front elevation view of a plant section according to the invention.
Figure 3:
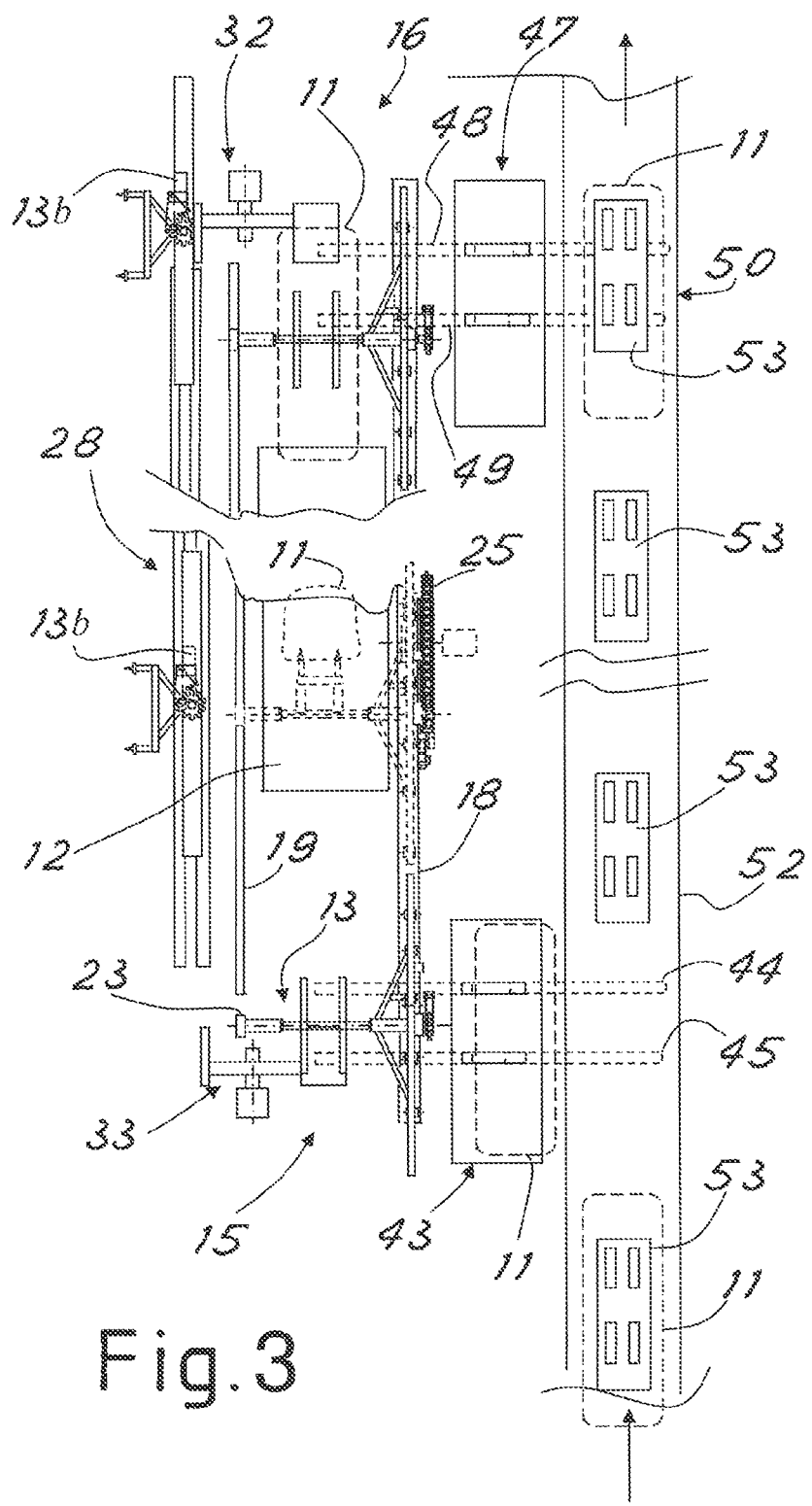
FIG. 3 shows a schematic plan view of a plant section according to the invention.

As can be clearly seen in FIGS. 1, 2 and 3, a first transport line 14 is designed to move sequentially the transport units 13 along a treatment path between a starting zone 15 and an arrival zone 16. The treatment path passes above the at least one treatment tank 12 so as to be able to immerse the car bodies 11 inside the tank. The treatment path may be located inside a tunnel 17. Car body immersion devices are provided for immersion and allow the downward movement of the car body present on a transport unit 13 passing above the tank. These devices may be of various kinds and preferably perform a pivoting overturning movement of the car body so as to ensure the evacuation of any air bubbles and allow more effective contact between the treatment liquid and all the exposed surfaces of the car body.

Advantageously, the first transport line 14 comprises a first travelway 18 and a second travelway 19 which are arranged parallel to each other along the treatment path and which pass along opposite side edges of the at least one tank. Preferably, these two travelways will be arranged laterally outside of the vertical plane of the tank so as to prevent any dirt from falling into tank from the overlying travelways. As can be clearly seen in FIG. 3, preferably each transport unit 13 may have, viewed from above, a T-shaped form for the purposes which will become clear below.

Each transport unit 13 therefore preferably comprises on one side a sliding carriage 20 which supports one end of a transverse shaft 21 from which advantageously support elements 22 for a car body to be transported on the transport unit extend.

The sliding carriage 20 is advantageously elongated in the direction of movement of the unit 13 on the first transport line (so as to have a longitudinal stability) and is intended to slide on the first travelway 18. For example the carriage may comprise sliding shoes or runner wheels which engage on the first travelway 18 (for example provided with a known motorized roller and/or motorized chain system) so that the transport unit engaged on the first transport line may be moved along the treatment path.

Sliding means or elements 23 for travel along the second travelway 19 are provided on the other end of the shaft 21 so as to provide the unit 13 with transverse stability. Preferably these sliding means or elements comprise a runner wheel 23 which is located on the end of the shaft opposite to the sliding carriage 20 so that this wheel 23 runs along the second travelway 19.

In a preferred embodiment, it is advantageously envisaged that the transverse shaft 21 may be controllably rotated so as to tilt the car body downwards about the shaft itself, so that it is immersed when it passes over the tank.

The shaft rotation means may be various, as may be imagined by the person skilled in the art.

Figure 5:
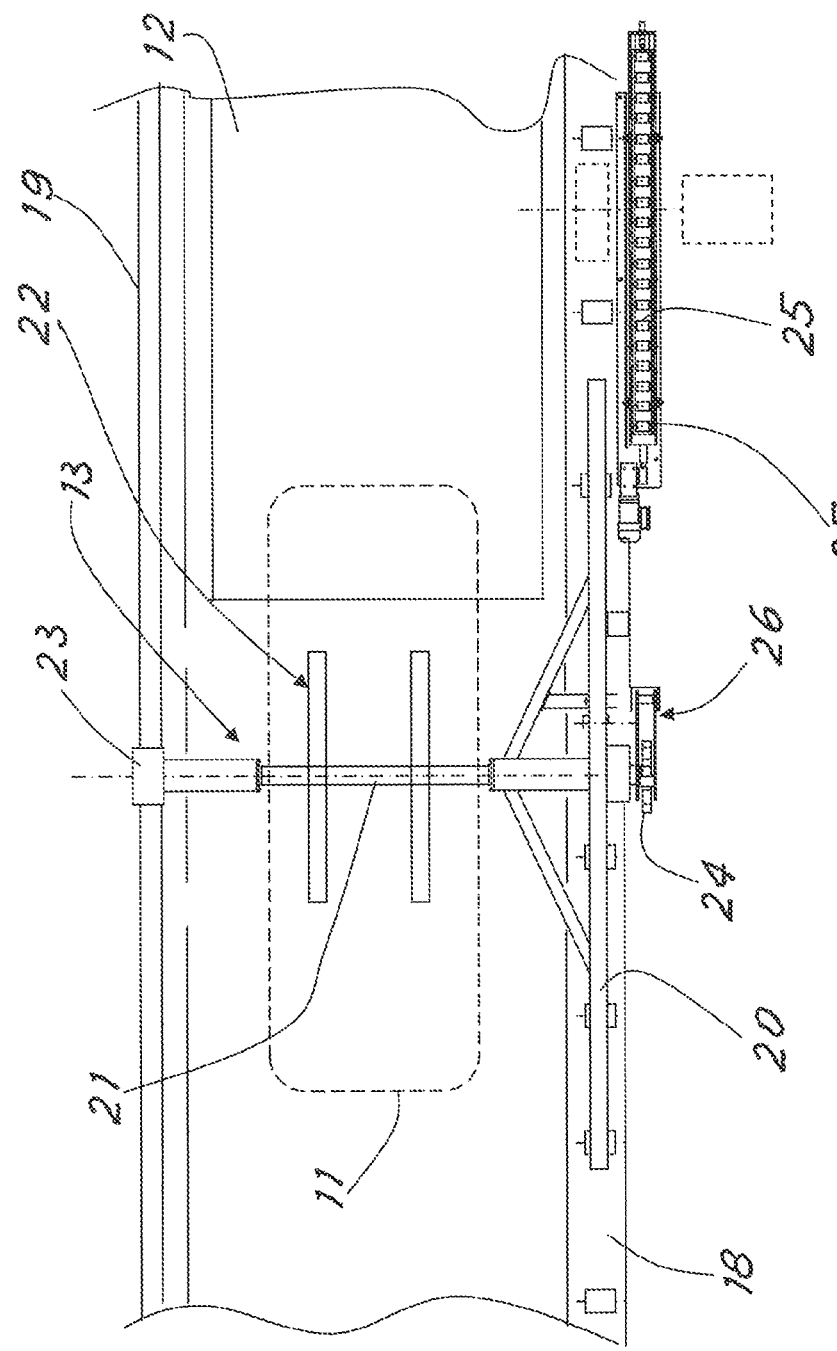
FIG. 5 shows a partial schematic and plan view of a zone for passage of a transport unit above a treatment tank in a plant according to the invention.

Advantageously, as can be clearly seen also in FIG. 5, a toothed wheel 24 may be provided, said wheel projecting laterally from the transport unit and being kinematically connected to the shaft 21 (for example via a gear transmission with a suitable reduction ratio) for controlled rotation thereof. At least one rack 25 is correspondingly provided alongside the tank, being arranged parallel to the direction of movement of the unit and being intended to engage with the said toothed wheel 24 so as to rotationally actuate the shaft by means of the movement of the transport unit along the portion of the first transport line situated opposite the rack.

Obviously, more than one rack may be provided along the path. For example, one rack may be designed to rotate the car body downwards and another, following, rack may be designed to rotate again the car body upwards. Between one rack and the next one the car body may also be left to hang freely downwards inside the tank. Cam means schematically indicated by 31 (as may now be easily imagined by the person skilled in the art) may also be provided in order to pivot the shaft when the car body is immersed.

The rotatable shaft, the actuating cam with the toothed wheel and any cam pivoting means may form the said immersion devices.

Suitable locking means (which may be easily imagined by the person skilled in the art) may also be advantageously provided in order to keep rotation of the shaft locked on the unit when the car body is in the normal straight position and the toothed wheel is for example not engaged with the racks. For example the locking means may comprise an engaging element 26 which, in the normal condition engages with the toothed wheel 24, locking it, and which is moved and disengaged from the wheel by means of a cam surface 27 suitably arranged along the travel path of the unit along portions of the path where free rotation of the shaft is desired. The plant 10 also has a second transport line 28 along which the empty transport units are brought back from the arrival zone 16 to the starting zone 16.

This second transport line 28 is adapted to convey the transport units rotated on one side vertically relative to their normal position for transporting the car bodies. This is shown by way of example in FIG. 1 with the transport unit indicated by 13*b* hung from the second transport line 28.

Advantageously the second transport line may comprise an overhead conveyor 29,30 with which the transport units are coupled. For example, coupling may be performed with the sliding carriage 20 on the conveyor and with the other end of the shaft which hangs downwards.

The overhead conveyor may comprise two motorized travelways 29 and 30 arranged parallel and with the space between them suitable for allowing the part of the unit which hangs from the carriage 20 to pass through. In this way, the unit remains hung and guided with the carriage resting on the two travelways 29 and 30. As can be clearly seen in FIG. 3 and in FIG. 4, in the arrival zone 16 there is a first transfer device 32 which picks up a transport unit 13 from the first transport line 14, rotates it on one side vertically so as to bring it into the return condition and delivers it to the second transport line 28, which brings it back again to the starting zone.

As can be seen clearly also in FIG. 1, in the starting zone 15 there is a second transfer device 33 which picks up a transport unit from the second transport line in the return condition, rotates it into the normal position for transporting the car bodies and delivers it again to the first transport line 14.

Advantageously, the first and second transfer devices 32 and 33 each comprise a structure, 34 and 35 respectively, which is motorized so as to controllably rotate about its horizontal axis 36, 37, advantageously parallel to the direction of the travel of the transport units at least in the respective arrival and departure zones. The structures 34 and 35, advantageously generally in the form of a disc or square, are provided peripherally with coupling means 38 for gripping and rotating the transport unit between the normal horizontal position and the vertical return position.

Advantageously, as can be clearly seen from the figures, the coupling means 38 may be arranged on the motorized structure at 90° intervals around the horizontal axis of rotation of the structure such that, with each 90° rotation, a coupling 38 is in the vertical or horizontal position.

The coupling means may be realized in various ways, also depending on the exact form of the transport units.

Figure 6:
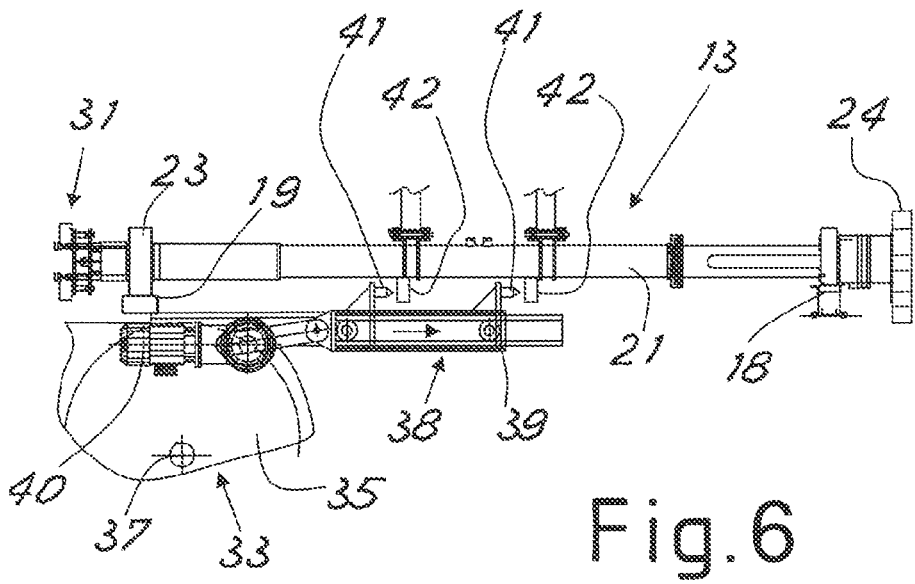
FIGS. 6 and 7 show partial, front elevation, schematic views respectively of a zone for delivery and a zone for return transportation of a transport unit to the start of a plant section according to the invention.
Figure 7:
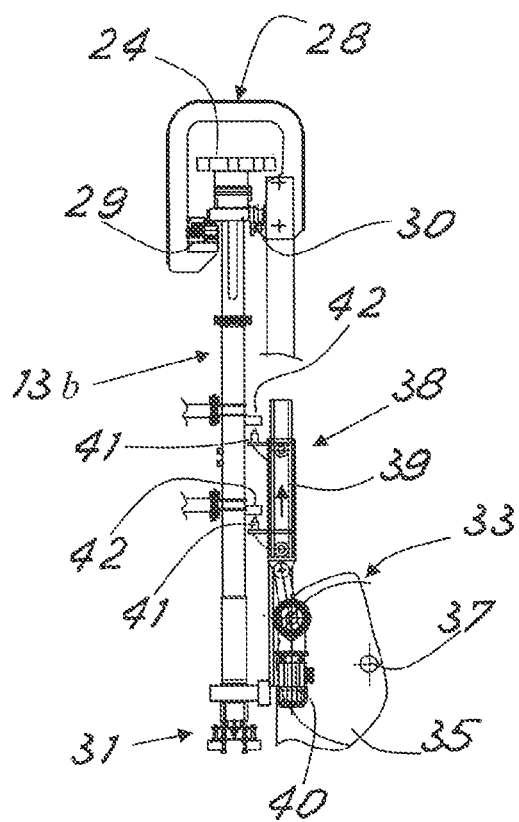

For example, a possible advantageous embodiment is schematically shown in FIGS. 6 and 7 which show, for the sake of convenience, a transport unit in the starting zone with the transfer device 33, but which are also be valid conversely for the arrival zone with the transfer device 32.

FIG. 6 shows the coupling means in the position for coupling/release of a transport unit in its horizontal position on the first transport line 14.

FIG. 7 shows the coupling means in the position for coupling/release of a transport unit in its vertical position on the second transport line 28.

As can be seen in FIGS. 6 and 7, each coupling means 38 may comprise a coupling platform 39 slidable by means of a drive motor 40 for inserting engaging pins 41 inside suitable seats 42 in the transport unit.

This allows the transport unit arriving in the arrival zone by means of the first transport line 14 to be gripped, rotated vertically, raised from the first transport line 14 and coupled and released onto the second transport line 28. Similarly, this also allows the empty transport unit arriving in the starting zone by means of the second transport line 28 to be gripped again, removed from the second transport line 28, horizontally rotated and rested and released on the first transport line 14.

As can be clearly seen in FIGS. 1 and 3, the plant 10 may also advantageously comprise a loading device 43 in the vicinity of the starting zone 15 for transferring a car body onto a transport unit 13 which has been delivered to the first transport line 14 by the second transfer device 33.

As can be clearly seen in FIG. 3, this loading device 43 may comprise motorized-track arms 44 and 45 which extend so as to move transversely a car body from a pick-up zone 46 to the area above the transport unit which is waiting in the starting position.

Figure 4:
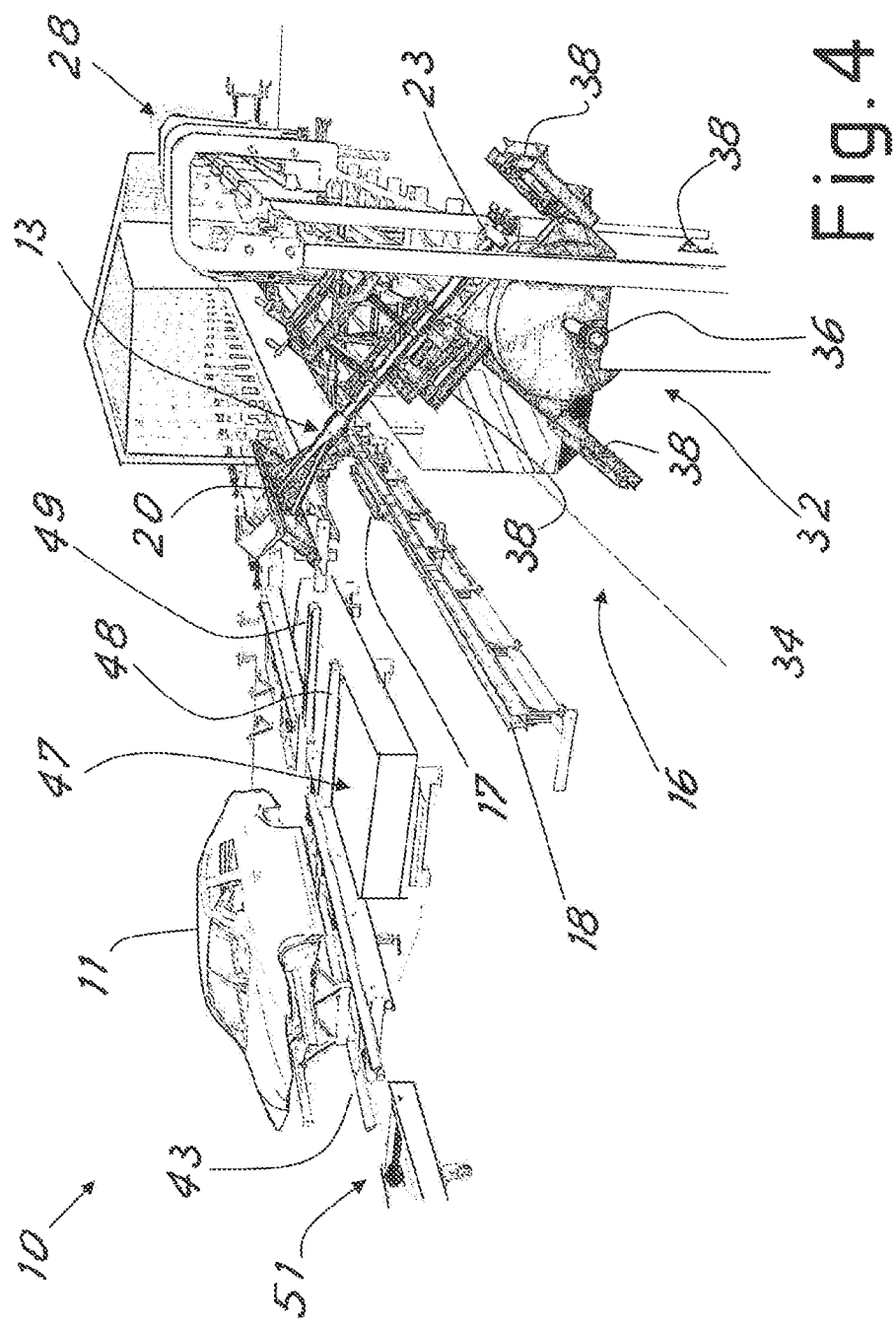
FIG. 4 shows a schematic perspective view from an exit end of a plant according to the invention.

Similarly, as can be clearly seen in FIGS. 3 and 4, the plant 10 may also advantageously comprise an unloading device 47 in the vicinity of the arrival zone 16 for transferring a car body from a transport unit 13 which has arrived loaded along the first transport line 14, before pick-up of this transport unit by the second transfer device 32.

As can be clearly seen again in FIG. 3, this unloading device 47 may comprise motorized-track arms 48 and 49 which extend so as to move transversely a car body from the transport unit to an unloading zone 50.

Advantageously, there may also be a third transport line 51 from where the loading device 43 picks up sequentially the car bodies and on which the unloading device 47 sequentially deposits sequentially the car bodies. This third transport line may be of any known type suitable for the sequential transportation of car bodies. For example it may comprise a travelway 52 with transport carriages 53.

At this point it is clear how the objects of the invention have been achieved. Owing to the principles of the invention, it is possible to obtain a relatively simple and compact plant which poses little risk of jamming. The first and second transport lines may be advantageously straight and extend parallel and alongside each other, in view also of the small volume of the second transport line which may also advantageously make use of the vertical extension of the tanks and any tunnel above the tanks in order to allow hanging of the transport units returning along said line.

The transport units may also be rapidly recycled at the end of the car body treatment path so that it is possible to have a small number thereof.

Obviously the description given above of embodiments applying the innovative principles of the present invention is provided by way of example of these innovative principles and must therefore not be regarded as limiting the scope of the rights claimed herein.

For example, the structure of the transport unit may be different from that shown and for example have an elongated transport carriage on both sides of the transport unit.

The number and length of the tanks may obviously be chosen as required and consequently the length of the transport lines and in some cases the number of transport units will vary.

The invention claimed is:

1. A plant for treatment of car bodies by immersion in at least one treatment tank, the plant comprising:
    a plurality of transport units each intended to carry a car body;
    a first transport line along which the transport units with the car bodies move sequentially between a starting zone and an arrival zone so as to pass over the at least one treatment tank and to immerse the car bodies using car body immersion devices; and
    a second transport line along which empty transport units are returned from the arrival zone to the starting zone;
    wherein the second transport line is configured to convey the transport units rotated on one side vertically relative to a normal position for transporting the car bodies,
    wherein in the arrival zone, there is a first transfer device which picks up a transport unit from the first transport line, rotates the transport unit on one side vertically so as to bring the transport unit into a return condition, and delivers the transport unit to the second transport line, and
    wherein in the starting zone, there is a second transfer device which picks up a transport unit from the second transport line in the return condition, rotates the transport unit into the normal position for transporting the car bodies, and delivers the transport unit to the first transport line.

2. The plant of claim 1, wherein the first and second transfer devices each comprise a structure which is motorized for controlled rotation about a horizontal axis and which is peripherally provided with coupling means for gripping and rotating the transport units between the normal horizontal position and the vertical return position.

3. The plant of claim 2, wherein the coupling means are arranged on the motorized structure at intervals of 90° around the horizontal axis.

4. The plant of claim 1, wherein the first transport line comprises a first travelway and a second travelway parallel to each other and passing along opposite side edges of the at least one treatment tank, and each transport unit comprises on one side a sliding carriage supporting one end of a transverse shaft from which support elements for supporting a car body to be carried extend, the sliding carriage being elongated in direction of movement of the transport unit on the first transport line and being intended to slide on the first travelway, the transverse shaft having a sliding element located on its end which is opposite to the sliding carriage, the sliding element being designed to slide on the second travelway.

5. The plant of claim 4, wherein in order to realize the car body immersion device, the transverse shaft can be controllably rotated so as to tilt the body downwards about the transverse shaft and immerse it in the at least one treatment tank.

6. The plant of claim 5, wherein in order to realize the car body immersion device, the transport unit further comprises a toothed wheel which is kinematically connected to the transverse shaft for controlled rotation thereof and, alongside the at least one treatment tank, there is at least one rotational drive device comprising a rack which is designed to engage with the toothed wheel so as to actuate the rotation of the transverse shaft by means of the movement of the transport unit along a portion of the first transport line opposite the rack.

7. The plant of claim 1, wherein a loading device is provided near the starting zone in order to transfer a car body onto a transport unit delivered to the first transport line by the second transfer device.

8. The plant of claim 1, wherein near the arrival zone there is an unloading device for transferring a car body from a transport unit prior to pick-up of the transport unit from the first transport line.

9. The plant of claim 7, wherein near the arrival zone there is an unloading device for transferring a car body from a transport unit prior to pick-up of the transport unit from the first transport line, and
    wherein the plant further comprises:
    a third transport line from which the loading device sequentially picks up the car bodies and onto which the unloading device sequentially deposits the car bodies.

10. The plant of claim 4, wherein the second transport line comprises an overhead conveyor on which the transport units are engaged with the sliding carriage and with the transverse shaft hanging downwards.

11. A plant for treatment of car bodies by immersion in at least one treatment tank, the plant comprising:
- a plurality of transport units each intended to carry a car body;
- a first transport line along which the transport units with the car bodies move sequentially between a starting zone and an arrival zone so as to pass over the at least one treatment tank and to immerse the car bodies using car body immersion devices; and
- a second transport line along which empty transport units are returned from the arrival zone to the starting zone;
- wherein the second transport line is configured to convey the transport units rotated on one side relative to a normal position for transporting the car bodies,
- wherein in the arrival zone, there is a first transfer device which picks up a transport unit from the first transport line, rotates the transport unit on one side so as to bring the transport unit into a return condition, and delivers the transport unit to the second transport line, and
- wherein in the starting zone, there is a second transfer device which picks up a transport unit from the second transport line in the return condition, rotates the transport unit into the normal position for transporting the car bodies, and delivers the transport unit to the first transport line.

12. The plant of claim 11, further comprising:
- a loading device;
- wherein the loading device is configured to transfer a car body onto the transport unit delivered to the first transport line by the second transfer device.

13. The plant of claim 12, further comprising:
- a third transport line;
- wherein the loading device is configured to sequentially pick up the car bodies from the third transport line.

14. The plant of claim 11, further comprising:
- an unloading device;
- wherein the unloading device is configured to transfer a car body from the transport unit prior to pick-up of the transport unit from the first transport line.

15. The plant of claim 14, further comprising:
- a third transport line;
- wherein the unloading device is configured to sequentially deposit the car bodies on the third transport line.

16. A plant for treatment of car bodies by immersion in at least one treatment tank, the plant comprising:
- a plurality of transport units;
- a first transport line;
- a second transport line;
- a first transfer device; and
- a second transfer device;
- wherein each of the transport units is configured to carry a car body,
- wherein the first transport line is configured to move the transport units sequentially between a starting zone and an arrival zone, so as to pass over the at least one treatment tank and to immerse the car bodies using car body immersion devices,
- wherein the second transport line is configured to return empty transport units from the arrival zone to the starting zone,
- wherein the second transport line is further configured to convey the empty transport units rotated on one side relative to a normal position for transporting the car bodies,
- wherein the first transfer device is configured to pick up a transport unit from the first transport line, to rotate the transport unit on one side so as to bring the transport unit into a return condition, and to deliver the transport unit to the second transport line, and
- wherein the second transfer device is configured to pick up a transport unit from the second transport line in the return condition, to rotate the transport unit into the normal position for transporting the car bodies, and to deliver the transport unit to the first transport line.

17. The plant of claim 16, further comprising:
- a loading device;
- wherein the loading device is configured to transfer a car body onto the transport unit delivered to the first transport line by the second transfer device.

18. The plant of claim 17, further comprising:
- a third transport line;
- wherein the loading device is configured to sequentially pick up the car bodies from the third transport line.

19. The plant of claim 16, further comprising:
- an unloading device;
- wherein the unloading device is configured to transfer a car body from the transport unit prior to pick-up of the transport unit from the first transport line.

20. The plant of claim 19, further comprising:
- a third transport line;
- wherein the unloading device is configured to sequentially deposit the car bodies on the third transport line.

* * * * *